United States Patent
Pasdar

(10) Patent No.: US 9,434,300 B2
(45) Date of Patent: Sep. 6, 2016

(54) MULTI-COLOR IN-DASH LIGHTING SYSTEM FOR CHANGING VEHICLE BACKLIGHTING

(71) Applicant: Mohammad A. Pasdar, Halifax (CA)

(72) Inventor: Mohammad A. Pasdar, Halifax (CA)

( * ) Notice: Subject to any disclaimer, the term of this patent is extended or adjusted under 35 U.S.C. 154(b) by 81 days.

(21) Appl. No.: 13/904,674

(22) Filed: May 29, 2013

(65) Prior Publication Data

US 2014/0226303 A1   Aug. 14, 2014

Related U.S. Application Data

(60) Provisional application No. 61/689,030, filed on May 29, 2012.

(51) Int. Cl.
*F21S 8/10* (2006.01)
*B60Q 3/00* (2006.01)
*B60K 37/02* (2006.01)

(52) U.S. Cl.
CPC ............. *B60Q 3/001* (2013.01); *B60K 37/02* (2013.01)

(58) Field of Classification Search
CPC ........ F21S 48/00; B60Q 3/00; B60Q 3/0293
USPC .............................. 362/23.08, 488, 489, 490
See application file for complete search history.

(56) References Cited

U.S. PATENT DOCUMENTS

| | | | |
|---|---|---|---|
| 6,517,226 B1* | 2/2003 | Zimmermann et al. | 362/488 |
| 6,575,607 B1* | 6/2003 | Klemish et al. | 362/489 |
| 7,344,277 B2 | 3/2008 | Anderson, Jr. et al. | |
| 7,385,359 B2 | 6/2008 | Dowling et al. | |
| 7,507,008 B2 | 3/2009 | Clauw et al. | |
| 8,188,666 B2 | 5/2012 | Tseng | |
| 2011/0175754 A1 | 7/2011 | Karpinsky | |
| 2012/0286661 A1* | 11/2012 | Salter et al. | 362/490 |

FOREIGN PATENT DOCUMENTS

| | | |
|---|---|---|
| JP | 2004237891 A | 8/2004 |
| JP | 2005212667 A | 8/2005 |

* cited by examiner

*Primary Examiner* — David V Bruce
(74) *Attorney, Agent, or Firm* — Robert C. Montgomery; Montgomery Patent & Design, LLC

(57) ABSTRACT

A vehicle interior lighting system for enabling a driver to control the intensity and color of interior lighting is presented. The system includes a controller that controls the color and intensity of interior lighting, a selector control that switches color and intensity controls to various groups of interior lights (such as instrument lights, indicator light), a color that controls light color and an intensity control that controls light intensity. In practice the controller is a microcontroller, the lights are tri-color light emitting diodes, the selector control is a multi-position switch, and the color and intensity controls are potentiometers.

19 Claims, 3 Drawing Sheets

MULTI-COLOR IN-DASH LIGHTING SYSTEM FOR CHANGING VEHICLE BACKLIGHTING

RELATED APPLICATIONS

This utility patent application is a continuation of the provisional patent application filed with the United States Patent and Trademark Office on May 29, 2012 and referenced by No. 61/689,030.

FIELD OF THE INVENTION

The presently disclosed subject matter is directed to vehicle interior lighting systems. More particularly, the present invention relates to adjustable intensity, adjustable color vehicle interior lighting systems.

BACKGROUND OF THE INVENTION

In the prior art, almost all vehicle interior lighting was viewed primarily as functional. This much light needed in this area that much in that area and instrumentation needed backlighting to be visible at night. Most vehicle cabs were equipped with dome and map lights for cab visibility, door lights for safe entry and exit, backlit instrument panels and controls, and maybe a lit vanity mirror and glove box. All purely functional, almost always from incandescent bulbs, almost always white, and except for instrument backlighting, most did not have adjustable intensity.

While the forgoing prior art vehicle interior lighting scheme was useful and effective for their functional purposes, the achieved lighting effects were seldom attractive. Over the last couple of years LED's (Light-Emitting Diodes) have made significant inroads into motor vehicle lighting systems. While initially the new LED lighting was for headlights and tail lights, LED's gradually found their way into vehicle interior lighting. New vehicles now use LED's rather extensively for passenger compartment general lighting, instrumentation lighting and warning lights.

LED's typically last longer than the vehicles they are installed in. Thus bulb replacement may become a thing of the past. In addition, LED's have reduced power consumption, which enables smaller, and thus cheaper, power wiring. The lower power consumption enables redirection of available electrical power to other devices and applications that are becoming increasingly common in today's motor vehicles.

However, many people find that LED's produce light that is too bright, harsh, and generally unappealing. Bright lights of LED's are particularly troublesome at night. While driving at night the use of bright compartment interior lighting either by a passenger or driver creates discomfort and poor night vision for the driver because of the reflection of the bright light from the windshield into the driver's eyes. This creates a dangerous condition, particularly during emergencies.

Therefore, vehicles having aesthetically improved interior lighting would be beneficial. Particularly useful would be LED vehicle interior lighting that can be adjusted in both intensity and color. Ideally such LED vehicle interior lighting would enable aesthetically attractive lighting schemes at relatively low cost and with easy driver adjustability. Preferably such LED vehicle interior lighting would provide numerous colors and would have highly configurable lighting intensities, and would improve driver safety by reducing excessive light reflections while driving at night.

SUMMARY OF THE INVENTION

The principles of the present invention provide for vehicles having aesthetically improved interior lighting. Those principles specifically provide for LED vehicle interior lighting that can be adjusted in both intensity and color. Such LED vehicle interior lighting enables aesthetically attractive lighting schemes at relatively low cost and with easy driver adjustability. The LED vehicle interior lighting provides numerous colors and is highly configurable in lighting intensities.

A vehicle interior lighting system in accord with the present invention includes a controller, a selector control that applies a user adjustable selector input to the controller, a color control that applies a user adjustable color input to the controller, and an intensity control that applies a user adjustable intensity input to the controller. The vehicle interior lighting system further includes an instrument cluster having instrument illumination devices emitting light with a color and intensity, and an array of indicators having indicator illumination devices emitting light with a color and intensity. The controller controls the color of the instrument illumination devices based on a color input, the color of the indicator illumination devices based on a color input, the intensity of the instrument illumination devices based on an intensity input, and the intensity of the indicator illumination devices based on an intensity input.

Beneficially, the vehicle interior lighting system also includes compartment interior illumination devices emitting light having a color and intensity, where the controller controls the intensity based on an intensity input, and the color based on a color input. In practice the instrument illumination devices, the indicator illumination devices, and the compartment interior illumination devices are light-emitting diodes, preferably tri-color light-emitting diodes.

Usefully the color control is a potentiometer, the intensity control is a potentiometer, and the controller includes an Analog to Digital converter for digitizing the intensity and color inputs. Preferably the selector control is a multiple position switch. When in a first position the instrument illumination devices, the indicator illumination devices, and the compartment interior illumination devices are off. When in a second position the controller sets the intensity and color of the instrument illumination devices. When in a third position the controller sets the intensity and color of the indicator illumination devices. When in a fourth position the controller sets the intensity and color of the compartment interior illumination devices. When in a fifth and final position the controller sets the intensity and color of the instrument illumination devices, the indicator illumination devices; and the compartment interior illumination devices on an even and consistent manner.

Preferably the controller is a microcontroller, the vehicle interior lighting system includes a programming input port for receiving an operating program, and the microcontroller is a flash programmable microcontroller.

In practice the vehicle interior lighting system may include a first control device for turning the instrument illumination devices on/off, a second control device for turning the indicator illumination devices on/off, and a third control device for turning the compartment interior illumination devices on/off. The vehicle interior lighting system may also include a vehicle operation control device for selectively applying external electrical power to the vehicle interior lighting system.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

Figure 1:
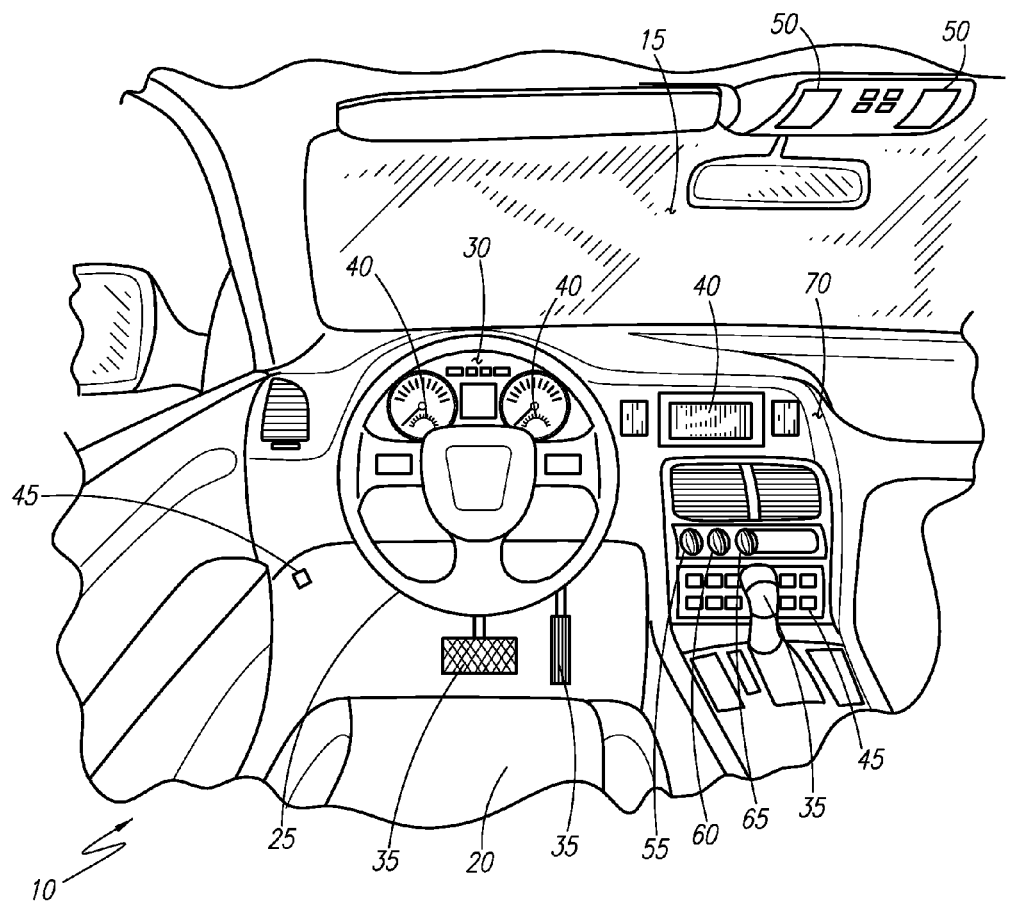
FIG. 1 is an isometric view of a variable color and variable intensity vehicle interior lighting system 10 according to the preferred embodiment of the present invention and installed in a motor vehicle passenger compartment 15.

DESCRIPTIVE KEY 10 lighting system
15 passenger compartment
20 driver's seat
25 steering wheel
30 instrument cluster
35 control device
40 instrument cluster illumination device
45 LED indicator light
50 interior light
55 five-position selector control switch
60 color adjustment potentiometer
65 intensity adjustment potentiometer
70 dashboard surface
75 vehicle electrical system
80 overcurrent protective device
85 vehicle operation control device
90 main control module
95 first multi-color LED driving circuit
100 second multi-color LED driving circuit
105 third multi-color LED driving circuit
110 tricolor LED
115 first voltage drop resistor
120 first control device
125 second control device
130 third control device
135 driving circuit
140 microcontroller
145 quartz oscillator
150 voltage regulator
155 second voltage drop resistor
160 interface connector
165 output transistor
170 four-wire output connection

DETAILED DESCRIPTION OF THE PREFERRED EMBODIMENT

Figure 2:
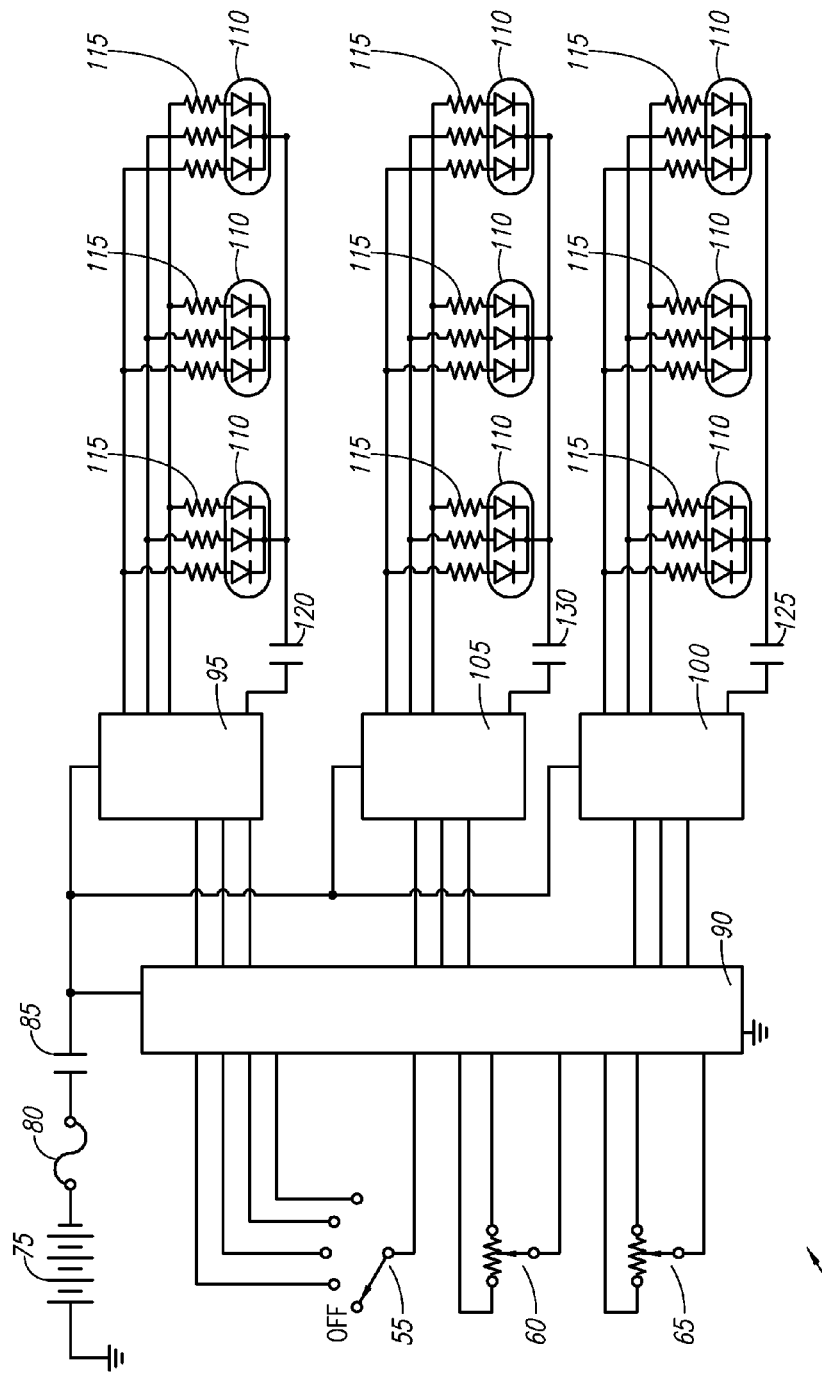
FIG. 2 is an electrical block diagram depicting major components of the interior lighting system 10 shown in FIG. 1; and, FIG. 3 is an electrical schematic of the major components of the interior lighting system 10 shown in FIGS. 1 and 2, specifically including a multi-color LED driving circuit.
Figure 3:
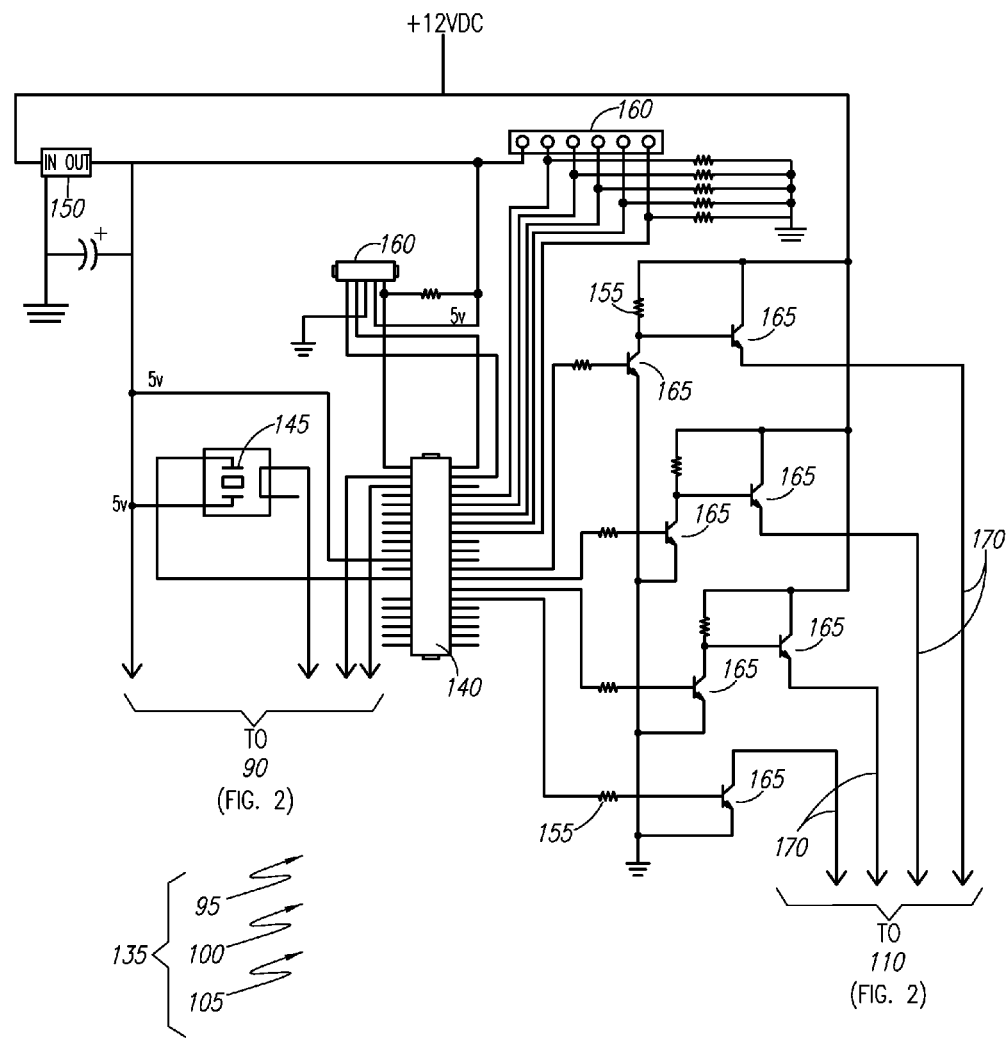

The best mode for carrying out the invention is presented in terms of its preferred embodiment, herein depicted within FIGS. 1 through 3, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The preferred embodiment for carrying out the principles of the present invention is shown in FIGS. 1 through 3. Referring now specifically to FIG. 1, the preferred embodiment is a motor vehicle multiple color lighting system having variable intensity, referred to herein after simply as a lighting system 10. FIG. 1 shows the lighting system 10 installed in a motor vehicle passenger compartment 15. The passenger compartment 15 includes well known devices such as a driver's seat 20, a steering wheel 25, an instrument cluster 30, and vehicle control devices 35 such as a gas pedal and a brake.

The instrument cluster 30 includes multiple illumination devices 40, multiple LED indicator lights 45, and multiple passenger compartment interior lights 50. The instrument cluster 30 includes all of the lighting devices typically seen within a motor vehicle passenger compartment 15 during night driving. The lighting system 10 enables driver control of the color and intensity level of the instrument cluster illumination devices 40, the LED indicator lights 45 and the passenger compartment interior lights 50, either together (they all change at the same time) or independently (only one (1) group of lights is adjusted). To that end the motor vehicle passenger compartment 15 includes a five-position selector control switch 55, a color adjustment potentiometer 60, and an intensity adjustment potentiometer 65, all of which are preferably located on a dashboard 70. The operations of the five-position selector control switch 55, the color adjustment potentiometer 60, and the intensity adjustment potentiometer 65 is described in more detail subsequently.

FIG. 2 presents an electrical block diagram of the major components of the lighting system 10. Electrical power for the lighting system 10 is provided by a vehicle electrical system 75 (such as a battery). The lighting system 10 is protected by an overcurrent protective device 80 such as a fuse. Electrical power passing through the fuse 80 is switched by a vehicle operation control device 85 such as an ignition circuit or a relay. The switched power is applied to a main control module 90, to a first multi-color LED driving circuit 95, to a second multi-color LED driving circuit 100, and to a third multi-color LED driving circuit 105.

The main control module 90 senses the positions of the five-position selector control switch 55, the color adjustment potentiometer 60, and the intensity adjustment potentiometer 65. The five-position selector control switch 55 has five (5) positions. The first position is OFF, the second position selects the first multi-color LED driving circuit 95 which provides lighting for the instrument cluster illumination devices 40 (see FIG. 1) for color and intensity adjustments. The third position selects the second multi-color LED driving circuit 100 which provides lighting for the LED indicator lights 45 (again see FIG. 1) for color and intensity adjustments. The fourth position selects the third multi-color LED driving circuit 105 which provides lighting for the passenger compartment interior lights 50 (once again see FIG. 1) for color and intensity adjustments. The fifth position selects all three (3) of the multi-color LED driving circuits 95, 100, and 105 for simultaneous color and intensity adjustments. The fifth position controls all three (3) at the same time while positions two (2) through four (4) control individual multi-color LED driving circuits 95, 100, and 105.

In position two (2) through five (5) of the five-position selector control switch 55 the respective resistances of the color adjustment potentiometer 60 and the intensity adjustment potentiometer 65 are read by the main control module 90. The main control module 90 then selectively (based on the position of the five-position selector control switch 55) applies signals that are representative of those resistances to the first multi-color LED driving circuit 95, to the second multi-color LED driving circuit 100, and/or the third multi-color LED driving circuit 105. Those signals are preferably determined by a microcontroller 140 within the main control module 90 as explained subsequently. However, applicable logic might be provided by any number of other types of devices such as discrete logic, a RAM or EPROM, a programmable logic controller, or the like, all of which are well known in the art.

The output of the first multi-color LED driving circuit 95 is applied to tricolor RGB LED's 110 through first resistors 115. While FIG. 2 shows only three (3) tricolor RGB LED's 110, the actual number may be much higher, envisioned as being up to a hundred (100), by continuing the parallel connection scheme depicted in FIG. 2. The actual number of tricolor RGB LED's 110 associated with the first multi-color LED driving circuit 95 is not a limiting factor of the present invention as different applications may use different numbers. Illumination control is provided by a first control device 120, for example a logic circuit, relay contacts or the like. When open, the first control device 120 deactivates the tricolor RGB LED's 110 connected to it, thus extinguishing the instrument cluster illumination devices 40 (see FIG. 1). For example, during day time driving, when the headlights turned off, or the like. When closed, such as at night, the tricolor RGB LED's 110 connected to the first control device 120 are lit.

The output of the second multi-color LED driving circuit 100 is passed to tricolor RGB LED's 110 through resistors 115. While FIG. 2 shows only three (3) tricolor RGB LED's 110 associated with the second multi-color LED driving circuit 100, the actual number may be much higher, envisioned as being up to a hundred (100), by continuing the parallel connection scheme as depicted in FIG. 2. Illumination control is provided by a second control device 125, for example a logic circuit, relay contacts or the like. When open, the second control devices 125 deactivates the tricolor RGB LED's 110 connected to it, thus extinguishing the LED indicator lights or switches light (as shown in FIG. 1). Again, this may occur during daytime driving, or when the headlights are off, or the like. The second multi-color LED driving circuit 100 controls the color and brightness of the LED indicator lights 45, such as on/off radio/CD switch, car fog switch, door lock and unlock switches, door handles lights, release lever light of the glove box, window switches, A/C switch, max/min heater switch, and associated other switches, handles, or release levers.

The output of the third multi-color LED driving circuit 105 is passed to tricolor RGB LED's 110 through resistors 115. While FIG. 2 depicts only three (3) tricolor (RGB) LED's 110 associated with the third multi-color LED driving circuit 105, the actual quantity can be much more, envisioned up to a hundred (100), by continuing the parallel connection scheme shown in FIG. 2. As such the actual number of tricolor RGB LED's 110 associated with the third multi-color LED driving circuit 105 is not intended to be a limiting factor of the present invention. Illumination control is provided by a third control device 130 such as door pin switch, a trunk pin switch, a dash-mounted control switch, or the like. This enables both automatic and manual control of the passenger compartment interior lights 50 which may be located at various positions within the motor vehicle passenger compartment 15. For example, to aid in entry, egress or simple illumination of interior surfaces (see FIG. 1). Therefore, the output of the third multi-color LED driving circuit 105 controls the color and brightness of the car interior lights 50.

FIG. 3 presents an electrical schematic diagram depicting the preferred embodiment components used in the first multi-color LED driving circuit 95, the second multi-color LED driving circuit 100, and the third multi-color LED driving circuit 105. Except for the actual number of lights, the construction, features, and operation for the first multi-color LED driving circuit 95, the second multi-color LED driving circuit 100, and the third multi-color LED driving circuit 105 are identical. Thus a generic driving circuit 135 is shown with the understanding this each of the multi-color LED driving circuits 95, 100, and 105 will have a similar driving circuit 135.

The driving circuit 135 incorporates a microcontroller 140 as the main controlling component of the lighting system 10. It is envisioned that the microcontroller 140 would be a CMOS FLASH-based 8-bit microcontroller in a forty (40) pin package, for example, a PIC16F887 or equivalent. Key features of the microcontroller 140 include two hundred fifty-six (256) bytes of EEPROM data memory, two (2) comparators, fourteen (14) channels of 10-bit Analog-to-Digital (A/D) converter, a synchronous serial port, and an Enhanced Universal Asynchronous Receiver Transmitter (EUSART). It should be noted that many other types of microcontrollers could be used and thus the use of the specifically named microcontroller 140 is not a limiting factor of the present invention. However, the PIC16F887 is widely available, widely used, low cost, well-supported by its manufacturer, and has a small number of op-codes which makes programming relatively easy.

In the driving circuit 135 microcontroller 140 timing is supplied by a quartz oscillator 145. Power is supplied by a voltage regulator 150. Resistors 155 are included to control current levels as required. The microcontroller 140 runs in accord with a customized program which may be written in the C programming language. The customized program controls the microcontroller 140 to change the color of the tricolor RGB LED's 110 (see FIG. 2) with up to two hundred fifty-five (255) different colors. Programming is downloaded to the microcontroller 140 using an interface connector 160. A series of output transistors 165 produce a four-wire output connection 170 which connects to the tricolor RGB LED's 110 (as shown in FIG. 2).

The color is governed by the color adjustment potentiometer 60 while the intensity is controlled by the adjustment potentiometer 65 reference FIG. 1). To that end the resistances of the color adjustment potentiometer 60 and the adjustment potentiometer 65 are digitized such as by use of built-in A/D converters. The digitized results are then applied, possibly after further processing, to the tricolor RGB LED's 110 via the four-wire output connection 170.

It is envisioned that other styles and configurations of the present invention can be easily incorporated into the teachings of the present invention, and while only one (1) particular configuration shall be shown and described for purposes of clarity and disclosure and not by way of limitation of scope.

The preferred embodiment of the present invention can be used by the common user in a simple and effortless manner with little or no training. It is envisioned that the lighting system 10 would be constructed in general accordance with FIG. 1 through FIG. 3. It is also envisioned that the teachings of the lighting system 10 would be adapted as standard or optional equipment on new motor vehicles. However, the lighting system 10 could also be adapted into an aftermarket kit for an existing motor vehicle. It should also be noted that the lighting system 10 could be utilized on all types of motor vehicles including automobiles, trucks, vans, SUV's, buses, boats, motorcycles, and planes.

After installation of the lighting system 10 in accordance with FIGS. 1-3 would be ready for operation. Prior to use, a driver in the motor vehicle passenger compartment 15 would program the desired color and intensity of the instrument cluster illumination devices 40, the LED indicator lights 45, and the passenger compartment interior lights 50 either independently or together. To program independently, the driver would place the five-position selector control switch 55 in the second position to adjust the lighting for the instrument cluster illumination devices 40. That enables the driver to adjust the color adjustment potentiometer 60 and the intensity adjustment potentiometer 65 to the desired levels for the instrument cluster illumination devices 40.

Next, the driver would place the five-position selector control switch 55 in the third position and adjust the lighting for the LED indicator lights 45. That enables the driver to adjust the color adjustment potentiometer 60 and the intensity adjustment potentiometer 65 to the desired levels for the LED indicator lights 45.

Then the driver places the five-position selector control switch 55 in the fourth position to adjust the lighting for the passenger compartment interior lights 50. That enables the driver to adjust the color adjustment potentiometer 60 and the intensity adjustment potentiometer 65 to the desired levels for the passenger compartment interior lights 50.

The foregoing enables independent light and illumination levels for the instrument cluster illumination devices 40, the LED indicator light 45, and the passenger compartment interior lights 50.

Should the same colors and intensity levels be desired for all lighting circuits, the driver would place the five-position selector control switch 55 to the fifth position. That enables the color adjustment potentiometer 60 and intensity adjustment potentiometer 65 to control the intensity for all lighting circuits at once.

During actual operation of a motor vehicle equipped with the lighting system 10 the operation of the instrument cluster illumination devices 40, the LED indicator lights 45, and the passenger compartment interior lights 50 will continue in an automatic and transparent manner as directed by the first control device 120, the second control devices 125, and the third control device 130. Should operation of any lighting circuit be desired or caused, the driver is rewarded with illumination at his desired intensity and with his preferred color.

It should be understood by those knowledgeable in the art that the teachings of the invention may be incorporated into multiple configurations such as, but not limited to: a multi-color flashlight, a multi-color stand light or tall lamp stand, a multiple mode status indicator, an ambient lighting system, and the like.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A vehicle interior lighting system, comprising:
   a controller;
   a selector control applying a user adjustable selector input to said controller;
   a color control applying a user adjustable color input to said controller;
   an intensity control applying a user adjustable intensity input to said controller;
   an instrument cluster having instrument illumination devices emitting light having a first color and a first intensity;
   an array of indicators having indicator illumination devices emitting light having a second color and a second intensity; and,
   compartment interior illumination devices emitting light having a third color and a third intensity;
   wherein said controller controls said first color of said instrument illumination devices based on a first color input;
   wherein said controller controls said second color of said indicator illumination devices based on a second color input;
   wherein said controller controls said third color of said compartment interior illumination devices based on a third color input;
   wherein said controller controls said first intensity of said instrument illumination devices based on a first intensity input;
   wherein said controller controls said second intensity of said indicator illumination devices based on a second intensity input; and,
   wherein said controller controls said third intensity of said compartment interior illumination devices based on a third intensity input.

2. The vehicle interior lighting system according to claim 1, wherein said instrument illumination devices, said indicator illumination devices, and said compartment interior illumination devices are light-emitting diodes.

3. The vehicle interior lighting system according to claim 2, wherein said light emitting diodes are tri-color light-emitting diodes.

4. The vehicle interior lighting system according to claim 3, wherein said color control is a potentiometer.

5. The vehicle interior lighting system according to claim 4, wherein said intensity control is a potentiometer.

6. The vehicle interior lighting system according to claim 5, wherein said controller includes an Analog to Digital converter for digitizing said intensity input.

7. The vehicle interior lighting system according to claim 5, wherein said selector control includes a multiple position switch.

8. The vehicle interior lighting system according to claim 7, wherein when said selector control is in a first position, said compartment interior illumination devices, said instrument illumination devices, and said indicator illumination devices are off.

9. The vehicle interior lighting system according to claim 8, wherein when said selector control is in a second position, said controller sets said first intensity and said first color of said instrument illumination devices.

10. The vehicle interior lighting system according to claim 9, wherein when said selector control is in a third position, said controller sets said second intensity and said second color of said indicator illumination devices.

11. The vehicle interior lighting system according to claim 10, wherein when said selector control is in a fourth position, said controller sets said third intensity and said third color of said compartment interior illumination devices.

12. The vehicle interior lighting system according to claim 11, wherein when said selector control is in a fifth position, said controller sets said first intensity and said first color of said compartment interior illumination devices, said second intensity and said second color of said instrument illumination devices; and said third intensity and said third color of said indicator illumination devices.

13. The vehicle interior lighting system according to claim 12, wherein said controller is a microcontroller.

14. The vehicle interior lighting system according to claim 13, wherein said microcontroller includes a programming input port for receiving an operating program.

15. The vehicle interior lighting system according to claim 14, wherein said microcontroller is a flash programmable microcontroller.

16. The vehicle interior lighting system according to claim 12, further including a first control device for turning said instrument illumination devices on and off.

17. The vehicle interior lighting system according to claim 12, further including a second control device for turning said indicator illumination devices on and off.

18. The vehicle interior lighting system according to claim 12, further including a third control device for turning said compartment interior illumination devices on and off.

19. The vehicle interior lighting system according to claim 1, further including a vehicle operation control device for selectively applying external electrical power.

* * * * *